Sept. 24, 1940.  R. W. PINCKNEY  2,215,837
COFFEE MAKER
Filed April 17, 1939  2 Sheets-Sheet 1

INVENTOR.
ROBERT W. PINCKNEY
BY Bates, Golrick, & Teare
ATTORNEYS

Sept. 24, 1940.    R. W. PINCKNEY    2,215,837
COFFEE MAKER
Filed April 17, 1939    2 Sheets-Sheet 2

INVENTOR.
ROBERT W. PINCKNEY
BY Bates, Goldrick, & Teare
ATTORNEYS

Patented Sept. 24, 1940

2,215,837

UNITED STATES PATENT OFFICE 2,215,837

COFFEE MAKER

Robert W. Pinckney, Elmhurst, Ill.

Application April 17, 1939, Serial No. 268,286

18 Claims. (Cl. 219—43)

The present invention is concerned with coffee-makers of the electrically heated French drip type, and the general object thereof is the provision of an apparatus for the efficient making of coffee of good quality in a short period of time.

A further object of the present invention is the provision of a coffee-maker of the drip type, adaptable for the reception of cold water which is directed around an electric heating element in measured quantity and at a rapid rate of flow, but at such rate that cold water will be brought to a correct temperature before contacting the coffee grounds.

A further object of my invention is the provision of an electric coffee-maker, which will be rapid in operation, yet efficient in heat transference, while consuming only a small amount of power.

A still further object of my invention is the provision of a novel electric heating unit for a coffee-maker of the French drip type, wherein the electric heating element is arranged in such a manner that efficient heat conductivity is obtained as the water passes from one vessel to another, during which passage the water is raised to a substantially boiling temperature, before passing over and through the coffee grounds.

Other objects of my invention will become apparent from the following description, which refers to the accompanying drawings illustrating two embodiments thereof. The essential characteristics of the invention are summarized in the claims.

Figure 1:
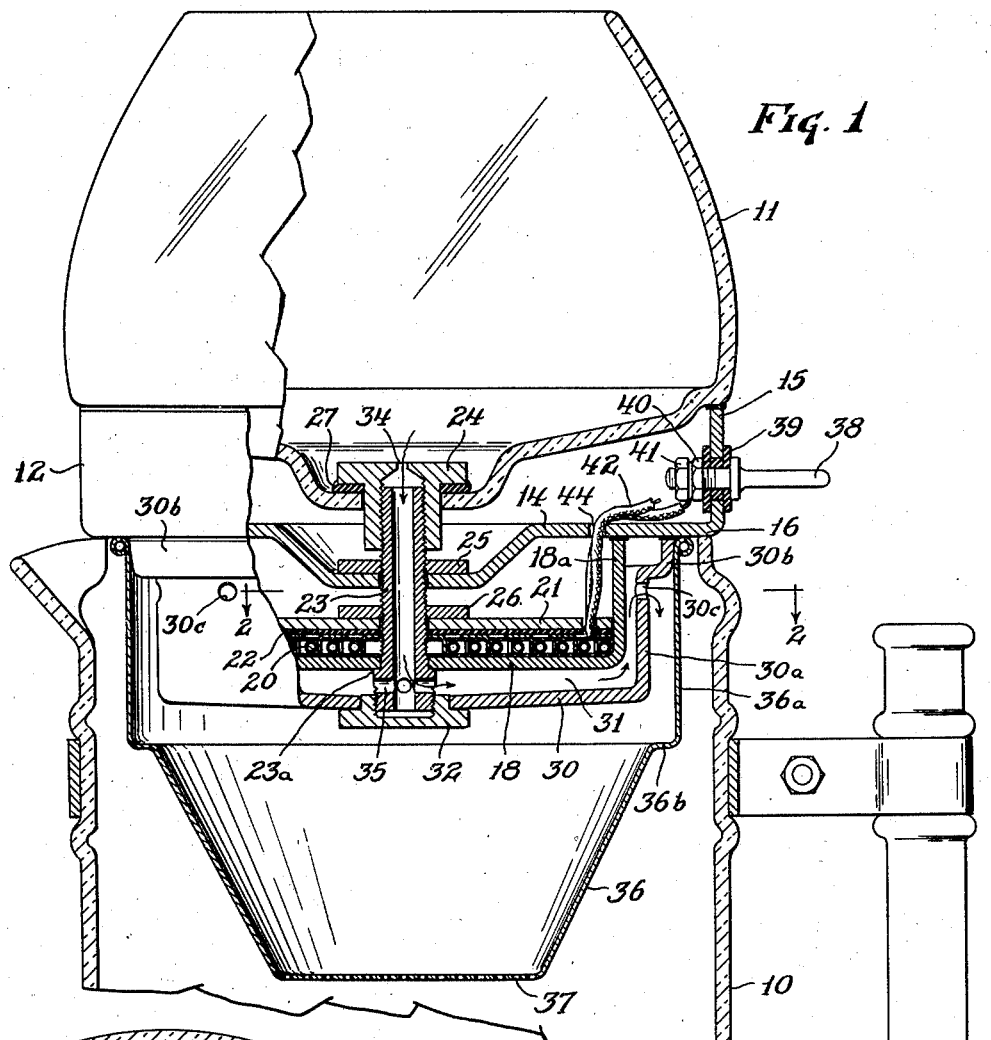
Figure 2:
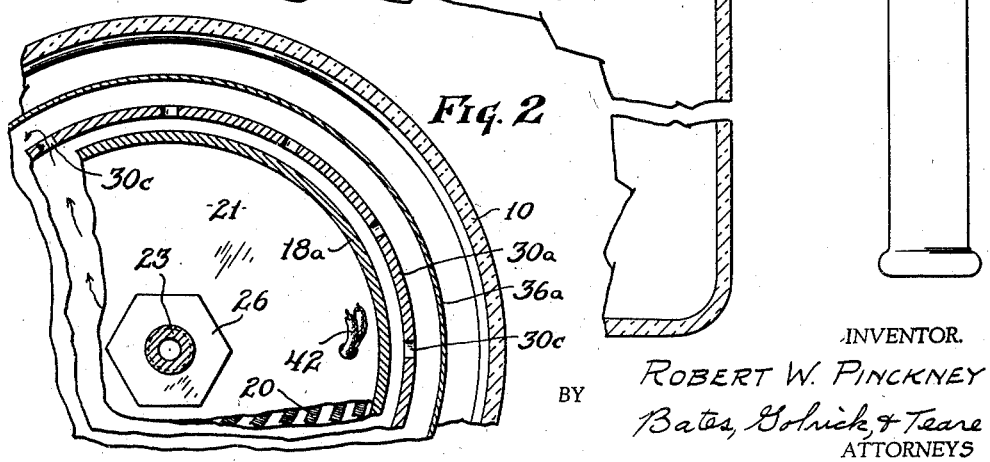
Figure 3:
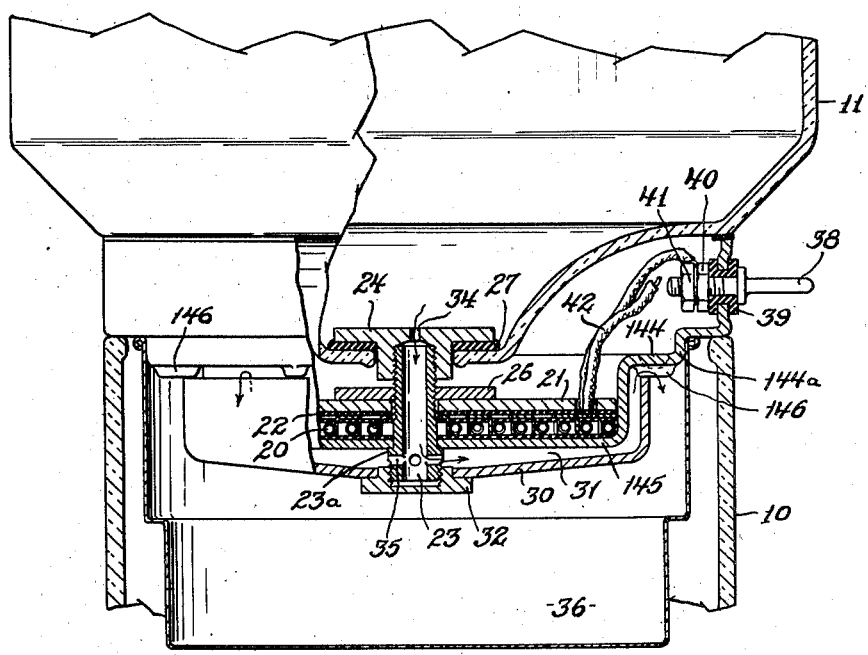
Figure 4:
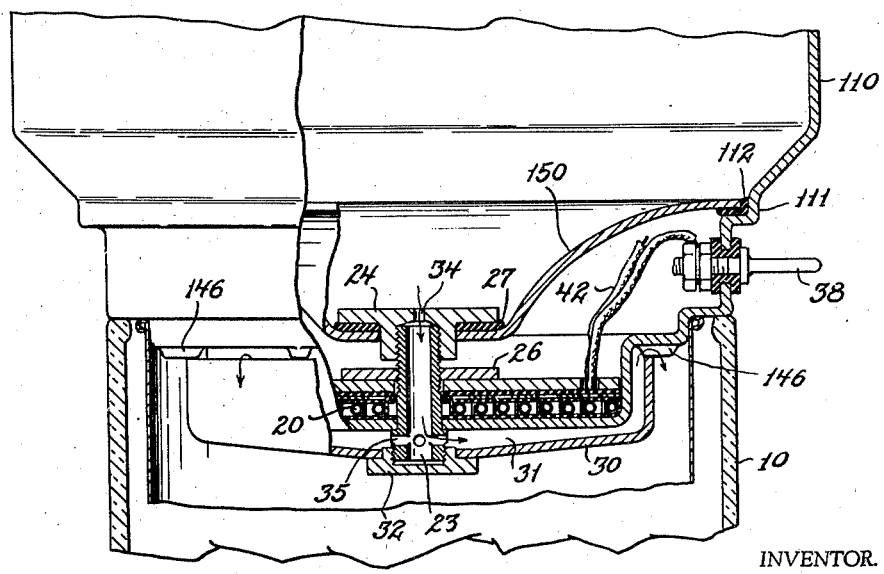

In the drawings Fig. 1 is a cross-sectional elevation of a coffee maker embodying the features of my invention; Fig. 2 is a cross-sectional view taken substantially along the lines 2—2 of Fig. 1; Fig. 3 is a modified form of coffee maker embodying my invention; and Fig. 4 is a third form of the invention.

Various types of electrically heated coffee-makers of the drip type have been proposed heretofore, and made, wherein the water was heated in an upper vessel by an electric element disposed adjacent the bottom thereof before passing to the coffee grounds container or basket, or the arrangement was such that the cold water was placed in an upper container from which it was permitted to escape through the bottom thereof and circulate in contact with two electrodes, whereby the water would be heated by electrolytic action, due to the presence of some salt in the water, whereupon the heated water would be permitted to flow into contact with the coffee grounds and pass therethrough to a brewed coffee container. In the latter type the electrodes proposed were metallic or graphitic in character. However, it has been found that with this electrode type of coffee-maker, considerable difficulty has been encountered in the use thereof, due to the fact that the salt content of the water varied to a great extent from locality to locality throughout the country, thus making it extremely difficult to proportion the areas of the electrodes, as well as the spacing thereof, to meet such varying conditions.

My invention contemplates obtaining all of the advantages of the latter type of coffee-maker, while at the same time eliminating the vexatious problem always present when coffee-makers of the electrode type are manufactured for general distribution throughout the country, and I accomplish this by enclosing an electric heating element of the resistance type within a metallic shell, which is disposed intermediate the water receptacle and the container for the brewed coffee. The entire heating unit is arranged and constructed in such a manner that the cold water is directed from the water receptacle downwardly to a point where it is caused to flow in contact with a substantial area of the heating element shell before being permitted to escape into the coffee grounds basket, and the construction of the heating unit is such that while it remains in assembled relation with the water receptacle during the major part of the use thereof, it nevertheless can be detached from the water receptacle in a ready convenient manner, for cleaning or repair.

Referring to the drawings, I show a brewed coffee receptacle 10, in the form of a coffee pot or container which may be made of a suitable metal, glass or other material, an open top cold water receptacle 11, preferably formed of glass, and an electric heating unit, generally indicated by the reference numeral 12 and which is disposed between the coffee container 10 and the cold water receptacle 11.

The heating unit 12 comprises a cup-shaped receptacle rest member 14, having a vertically extending annular flange 15, upon the upper edge of which the cold water receptacle 11 rests, while the lower perimeter portion 16 of the member 14 rests upon the upper edge of the coffee container 10. Disposed beneath the member 14 is an electric heating element shell member 18, preferably formed of aluminum or other high heat-conductive metal. The shell member 18, as will be noted, is also cup-shaped, and is provided with an upwardly extending annular flange 18a, which engages the bottom face of the member 14. If desired, a gasket may be inserted between the flange 18a and member 14. The shell 18a has disposed therein, but electrically insulated therefrom, a heating element 20, which is maintained in position by a top plate member 21 fitting within the shell member 18, there being insulation material 22 disposed between the plate member 21, and the heating element 20.

The cold water receptacle 11, the member 14, and the shell member 18, are held in assembled relation by an exteriorly threaded tubular member 23, and nut members 24, 25, and 26, respectively engaging the members 11, 14 and 18, as shown. A compressible washer member 27 is provided between the nut member 24 and the bottom wall of the glass receptacle 11. The nut member 26 engaging the plate 21 compresses the members comprising the heating element shell against a shoulder 23a formed upon the tubular member 23 near the bottom thereof.

A casing member 30 is provided to enclose the shell structure comprising the heating element assembly, and is proportioned as shown to provide along the bottom of the shell 18 and its annular flange 18a a water heating chamber 31. The casing member 30 is secured in assembled relation upon an extension of the tubular member 23 formed at the bottom thereof by a nut member 32 which causes an upwardly extending annular flange portion 30a of the casing 30 to abut against the underside of the member 14. If desired, a gasket may be interposed between the casing flange 30a and member 14.

The tubular member 23 is provided at its top with an orifice 34 of predetermined size, for a purpose to be explained hereinafter, and also is provided adjacent the bottom thereof with radially extending openings 35, whereby water flow communication between the interior of the water receptacle 11 and the water heating chamber 31 is afforded.

The flange 30a of the casing member 30 is provided with an annular, outwardly extending offset portion 30b, upon which is fitted an upper beaded portion of the coffee basket 36. The flange 30a of the casing member 30 is provided with a series of water outlets or openings 30c, formed in the casing member 30, at a position which is above the heating element 20, whereby water may flow from the water chamber 31 therethrough and into the coffee grounds basket 36.

The member 14 has mounted upon the annular flange 15 thereof a pair of electric plug connectors 38, suitably insulated therefrom by insulating means 39, each of the members 38 being held in position by any suitable means, such as a nut 40. Nut members 41 serve to connect the lead wires 42 to the connector members 38 and the lead wires extend downwardly through an opening 44, formed in the bottom of the member 14, as shown.

It will be noted that the coffee ground basket 36 can be conveniently slidably fitted upon the annular portion 30b of the casing member 30, and is formed to have an imperforate vertically and downwardly extending annular portion 36a which terminates in a ledge formation 36b. The lower portion of the coffee grounds basket may be of a conformed shape, converging toward the center of the basket, the bottom of the basket being provided with the usual perforations 37 for the obvious purpose of permitting the brewed coffee to drain into the coffee container 10.

The orifice 34 is of such size as to regulate the rate of flow of water from the cold water receptacle 11 to the water heating chamber 31, whereby a sufficient flow-time interval is obtained to permit the water flowing downwardly from the cold water receptacle 11 through the tubular member 23 and through the water heating chamber 31 to be heated to substantially the boiling temperature of water by the time the water passes through the openings 30c. Thereafter, the heated water has a tendency to flow along the outside surface of the casing 30 and drip therefrom at the annular corner thereof, the under surface thereof and from the unit member 30. Hence, the heated water is distributed over the surface of the coffee grounds in the basket 36.

In the arrangement shown in Figs. 1 and 2, should it be desired for any reason to either clean the interior of the tubular member 23, or any of the members comprising the heating unit, quick dis-assembly of the heating unit and cold water receptacle may be obtained by unscrewing the nut member 24 from its engagement with the tubular member 23. By removing the nut member 24, access to the terminal connections of the lead wires 42 may be obtained. Removal of the nut member 32 permits removal of the casing 30. Removal of the nut member 25 from the tubular member 23 permits access to the interior of the shell structure 18, carrying the heating element.

In operation, the required amount of properly ground coffee is placed in the bottom of the coffee basket 36, and the same is slip-fitted upon the annular shoulder 30b of the casing member 30. The receptacle heating unit and basket are then set upon the coffee container 10, whereupon the required amount of water corresponding to the desired number of cups of coffee desired is poured into the cold water receptacle 11, the heating unit having previously been connected to a source of power. The water immediately begins to flow through the orifice 34 and downwardly through the tubular member 23, and into the heating chamber 31, where it flows into contact with the hot walls of the shell member 18 containing the heating element. The water passes upwardly as it is being heated within the casing 30, to the outlets 38, whereupon it flows into the coffee basket.

As the heated water flows downwardly between the outer surface of the casing member 30 and the interior surface of the annular portion 36a of the coffee basket, it is guided to the coffee grounds in the basket and flows therethrough to the coffee container 10.

In Figs. 3 and 4 I show two modifications of the heating unit, wherein the various members which are common to the construction shown in Figs. 1 and 2 are given like reference numerals.

In the construction shown in Fig. 3, the shape of the receptacle rest member 144 is such that a pressed, cup-shaped portion 145 comprises the shell for the heating element 20 and the insulating members and the attachment of the cup-shaped portion 145, to the hollow tubular member 23 is, as shown and as hereinbefore described. The shell 144 is provided with an annular shoulder 144a, over which the top rim of the coffee ground basket 36 may be slip-fitted. The member 144 is provided with a series of downwardly struck or formed lugs 146, against which the top rim of the hot water casing member 30 may abut when the nut 32 is tightened upon the lower end of the tubular member 23, thus providing passageways between the interior of the casing and the coffee grounds basket. It will be noted that in this construction I have eliminated some of the parts shown in the construction illustrated in Figs. 1 and 2. However, the operation of the apparatus is the same as the apparatus shown in Fig. 1.

In Fig. 4 I show a third form of construction wherein the cold water receptacle 110 may be formed of metal and the bottom wall thereof is shaped generally to conform to the shape of the shell member 144, illustrated in Fig. 3. This arrangement necessitates the use of a false bottom 150, which functions in the same manner as the bottom walls or bottom portions of the cold water glass receptacles shown in Figs. 1 and 3, there being an annular shoulder 111 formed to receive a gasket 112, which serves to seal the perimeter of the member 150 relative to the annular wall of the metal receptacle 110.

In all three forms of the coffee maker described, the orifice 34 and the radially extending opening 35 are formed in the central tubular member 23 to be of such size that the rate of flow of the cold water under gravity pressure is such that a heating element of sufficient capacity can be used to raise the water to the desired temperature, namely, about 210 degrees Fahrenheit, during the period that the water is flowing through the lower part of the tubular member 23, radially along the bottom of the heating shell and upwardly adjacent the perimeter of the heating shell. There is also present a thermosyphon action upon the water during this heating flow period, and there is a peculiar action in the flow of the water. As the cold water flows into the heating chamber and reaches a temperature of about 210 degrees Fahrenheit, it surges upwardly and out of the surrounding casing into the coffee ground basket, leaving the heating chamber almost dry. The chamber is again filled with water under gravity pressure flow, whereby the water becomes rapidly heated and the action above described, and the movement of the hot water is repeated, and this action continues to be repeated until all of the water has flown from the cold water receptacle. This action indicates that the water in the chamber 31 is heated at such a rapid rate to the desired temperature that the inflowing cold water can have no influence upon the rapidly rising temperature of the water below and surrounding the heating element.

I claim:

1. A coffee-maker comprising a coffee brew receptacle, a water receptacle, an electric heating mechanism interposed between the two receptacles, including a sheathed heating element formed in disk-shape with a heat conducting liquid-tight metallic sheathing, means securing the heating mechanism to the water receptacle including a centrally disposed tubular member, a hot water casing surrounding the heating element and having liquid flow communication with the water receptacle through the tubular member and a coffee grounds basket supported by the casing, there being a hot water passageway between the interior of the casing above the heating element and communicating with the interior of the coffee grounds basket.

2. A coffee-maker comprising a coffee receptacle, a water receptacle, an electric heating mechanism interposed between the two receptacls including a water heating element, a hollow member extending from the bottom of the water receptacle, a hot water casing enclosing the heating element and having liquid flow communication with the water receptacle through the hollow member and a coffee grounds basket detachably connected to the hot water casing, there being passageways forming liquid flow communication between the interior of the coffee grounds basket and said casing.

3. A coffee-maker comprising a coffee receptacle, a water receptacle, an electric heating unit interposed between the two receptacles including a heating element, a heating element shell and a hollow member extending through the bottom of the water receptacle, a hot water casing surrounding the heating element connected to said shell in spaced relation to the heating element to provide a flowing water heating chamber and a coffee grounds basket disposed below the casing, there being passageways formed to provide for hot water flow from the interior of the casing to the interior of the coffee grounds basket.

4. A coffee-maker of the drip type comprising upper and lower vessels, an electric heating unit disposed between the vessels, said heating unit including an electric heating element metallically enclosed and adapted to heat flowing water approximately to the boiling point, a tubular structure having a passageway establishing liquid flow communication between the upper receptacle and a point below the electric heating element, a hot water vessel secured to the upper vessel by said tubular structure and serving to maintain the flow of water in contact with the electric heating element and having a flow outlet disposed above the heating element and a coffee ground basket extending to a point above said flow outlet whereby cold water placed in the upper receptacle will flow downwardly below the electric heating element, then radially outward in intimate contact with the heating element and upwardly to said outlet and into the coffee ground basket.

5. A heating unit for a coffee-maker of the drip type, adapted to be disposed between upper and lower liquid vessels and to be attached to the upper vessel and comprising an electric heating unit having a heat-conductive shell enclosing an electric element, a tubular structure for conducting water from said upper vessel to the shell, a casing carried by the tubular structure and enclosing said shell and in spaced apart relationship to thereby provide a water heating chamber, there being provided a hot water outflow passageway from the interior to the exterior of the casing, whereby water can be guided to flow downwardly and then into contact with the shell enclosing the heating element and then flow in an upward direction within the casing and out of said passageway.

6. A heating unit for a coffee-maker of the drip type, adapted to be attached to a cold water receiving vessel and comprising an electric heating unit having a heat-conductive shell enclosing an electric element, tubular means for conducting water from said vessel through the shell, and a casing carried by the tubular means and enclosing said shell and arranged in spaced part relationship thereto whereby a water heating chamber is provided, said casing having a hot water outflow passageway formed between the interior and the exterior of the casing.

7. A heating unit for a coffee-maker of the drip type, adapted to be attached to a cold water receiving vessel and comprising an electric heating unit having a heat-conductive shell enclosing an electric element, tubular means for conducting water from said vessel to the shell, a casing enclosing said shell and arranged in spaced apart relationship thereto whereby a water heating chamber is provided and said casing having a hot water outflow passageway formed in an annular wall thereof, a rest member adapted to be set upon a brewed coffee container and having an annular upwardly extending flange for supporting a cold water vessel and electric plug connector means carried by the flange of the rest member for connecting said electric element to a source of power, said shell casing and rest member all being attached to said tubular means.

8. A coffee-maker of the French drip type, comprising a brewed coffee container, a cold water-receiving receptacle comprising a cylindrical wall and separate bottom freely resting upon the container and a water heating unit of the electric resistance type disposed between the receptacle and container, said unit comprising a disk-like electric heating element, and a heat-conductive shell enclosing the element, a casing enclosing said shell with the walls thereof in spaced relation to the shell to provide a shallow hot water chamber, said shell being formed to engage the bottom perimeter of the receptacle, a tubular member having a water flow passageway extending from the cold water receiving receptacle to the hot water chamber, and means on the tubular member for securing the shell and the casing to the receptacle.

9. A coffee-maker of the French drip type, comprising a brewed coffee container, a cold water-receiving receptacle disposed above the container and a water-heating unit of the electric type disposed between the receptacle and container, said unit comprising a disk-like electric heating element, a heat-conductive shell intimately enclosing the element, a casing enclosing said shell with the walls thereof in spaced relation to the shell whereby a shallow hot water chamber is provided beneath the electric element, means providing a water flow passageway from the cold water-receiving receptacle to the hot water chamber, and a coffee grounds basket having a perforated bottom disposed below the heating unit and said casing having hot water passageways disposed above the heating element and communicating with the basket.

10. In a coffee-maker of the French drip type, the combination of a coffee brew container, a water receptacle disposed above the container, the receptacle having a clamped in bottom member, a water heating mechanism interposed between the container and the receptacle, said mechanism comprising an electrical water heating unit disposed within the container, a casing member surrounding said unit and flanged to provide a seat for the receptacle, a tubular member extending through the bottom of the receptacle and secured thereto and affording a water flow passageway between the interior of the receptacle and the bottom side of the heating unit, said tubular member serving to secure the bottom member of the receptacle, the heating unit and said casing in assembled relation with the perimeter of said bottom formation of the casing member.

11. In a coffee-maker of the French drip type, the combination of a coffee brew container, a water receptacle disposed above the container, a water heating mechanism interposed between the container and the receptacle, a casing member surrounding said mechanism to provide a water-heating chamber between the wall of the casing member and a wall of the heating mechanism, a tubular member extending through the bottom of the receptacle and secured thereto and affording a water flow passageway between the interior of the receptacle and the water-heating chamber, said heating mechanism, tubular member and casing comprising a unit assembly and a coffee grounds basket adapted to be removably attached to said casing.

12. A coffee-maker comprising a coffee brew receptacle, a water receptacle, an electric heating mechanism disposed at the bottom of the water receptacle including a sheathed heating element, a false bottom disposed within the water receptacle above the heating mechanism, means securing the heating mechanism to the water receptacle false bottom, including a centrally disposed hollow member, a hot water casing surrounding the heating element and having liquid flow communication with the water receptacle through the tubular member and a coffee grounds basket associated with the casing, there being a hot water passageway provided between the casing and the interior of the coffee grounds basket.

13. A coffee-maker comprising a coffee receptacle, a water receptacle having a separate bottom, an electric heating mechanism interposed between the two receptacles including an electrical resistance water heating element, a hollow member extending from the separable bottom of the water receptacle and through the heating element, a hot water casing enclosing the heating element and having liquid flow communication with the water receptacle through the hollow member and a coffee grounds basket detachably associated with the heating unit and there being a passageway provided between the interior of the casing and the basket.

14. A heating unit for a coffee-maker of the drip type, adapted to be attached to a cold water receiving vessel and comprising an electric heating unit having a heat-conductive shell enclosing an electric element, a restricted tubular means adapted to conduct water from said vessel to the shell and serving as a securing means between the bottom of the cold water vessel and the heating unit, and a casing enclosing said shell and arranged in spaced apart relationship thereto whereby a water heating chamber is provided, said casing having hot water outflow passageways formed in a wall thereof above the heating element.

15. A coffee-maker of the French drip type, comprising a brewed coffee container, a cold water-receiving receptacle disposed above the container and a water-heating unit of the electric type disposed between the receptacle and container, said unit comprising a disk-like electric heating element and a water impervious housing therefor, a casing enclosing said housing with the walls thereof in spaced relation to the housing whereby a shallow hot water chamber is provided beneath the electric element, means providing a water flow passageway from the cold water-receiving receptacle to the hot water chamber, the passageway in said means having a restriction, and a coffee grounds basket having a perforated bottom disposed below the heating unit and said casing, there being hot water passageways disposed above the heating element and communicating with the basket and the interior of the casing.

16. A coffee-maker of the French drip type, comprising a brewed coffee container, a cold water-receiving receptacle disposed above the container and a water-heating unit of the electric type disposed at the bottom of the receptacle, said unit comprising a disk-like electric heating element and the bottom of the receptacle comprising a heat-conductive shell enclosing the element, a false bottom in the receptacle forming a compartment for the heating unit in water-tight relation to the wall of the liquid receptacle, a restricted tubular structure provided with passageways for guiding water into contact with the lower surfaces of the shell.

17. In a coffee-maker of the French drip type, the combination of a coffee brew container, a water receptacle disposed above the container, an electric resistance water heating mechanism interposed between the container and the receptacle, said mechanism comprising a metallically enclosed water heating unit disposed within the container, and said unit having a water-heating chamber disposed beneath a resistance heating element of the heating unit, a cold water conduit extending through the bottom of the receptacle and the bottom of the heating unit and serving to secure said bottoms in spaced relation and having a restricted water flow passageway between the interior of the receptacle and the water-heating chamber.

18. A coffee maker of the drip type comprising a cold water receptacle having a centrally disposed tubular member secured to and depending from the bottom thereof, a casing member secured to the lower end of the tubular member and engaging the receptacle about the bottom perimeter of the receptacle, an electrical resistance heating element disposed within the casing beneath the bottom of the receptacle and spaced therefrom and a cup shaped member enclosing that part of the said casing in which the heating element is disposed, and said cup-shaped member being positioned in spaced relation to said part of the casing to provide a hot water chamber and a flow passageway extending from said tubular member radially outwardly and upwardly to thereby cause the heated water to flow over the outer perimeter of the cup member above the position of the heating element.

ROBERT W. PINCKNEY.